(12) United States Patent
Brito

(10) Patent No.: US 11,466,623 B2
(45) Date of Patent: Oct. 11, 2022

(54) ENGINE WITH START ASSIST

(71) Applicant: PRATT & WHITNEY CANADA CORP., Longueuil (CA)

(72) Inventor: Roberto Brito, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/314,576

(22) Filed: May 7, 2021

(65) Prior Publication Data

US 2021/0262394 A1    Aug. 26, 2021

Related U.S. Application Data

(63) Continuation of application No. 16/143,823, filed on Sep. 27, 2018, now Pat. No. 11,028,778.

(51) Int. Cl.

| | |
|---|---|
| *F02C 7/268* | (2006.01) |
| *F01D 15/10* | (2006.01) |
| *F02C 7/32* | (2006.01) |
| *F02C 7/36* | (2006.01) |
| *F16H 1/32* | (2006.01) |

(52) U.S. Cl.
CPC .............. *F02C 7/268* (2013.01); *F01D 15/10* (2013.01); *F02C 7/32* (2013.01); *F02C 7/36* (2013.01); *F16H 1/32* (2013.01); *F05D 2260/40311* (2013.01); *F05D 2260/85* (2013.01)

(58) Field of Classification Search
CPC ......... F16H 1/28–48; F16H 37/00–022; F16H 37/04; F16H 37/041
See application file for complete search history.

(56) References Cited

U.S. PATENT DOCUMENTS

| | | | |
|---|---|---|---|
| 2,266,050 | A | 12/1941 | Lampton |
| 2,266,858 | A | 12/1941 | Gehret |

(Continued)

FOREIGN PATENT DOCUMENTS

| | | |
|---|---|---|
| GB | 685939 | 1/1953 |
| GB | 702760 | 1/1954 |

(Continued)

OTHER PUBLICATIONS

Mengle et al., "Lobed Mixer Design for Noise Suppression Acoustic and Aerodynamic Test Data Analysis (2002)", NASA, NASA/CR—2002-210823/vol. 1.

(Continued)

*Primary Examiner* — Timothy Hannon
(74) *Attorney, Agent, or Firm* — Norton Rose Fulbright Canada LLP

(57) ABSTRACT

An engine comprises a first power input and a second power input, a main load, and a transmission engaged with the first power input, the second power input, and the main load. An epicyclic gear train is engaged with the first power input and the main load. A brake in a drive condition engages with the epicyclic gear train to transfer power from the first power input to the main load. The brake in a start condition disengages from the epicyclic gear train to decouple the first power input from the main load. A start assist motor is engaged with part of the transmission separate from the epicyclic gear train. The start assist motor in the start condition rotates the main load to initiate start up of the engine, and in the drive condition prevents transferring power to the main load.

20 Claims, 6 Drawing Sheets

(56) References Cited

U.S. PATENT DOCUMENTS

| | | |
|---|---|---|
| 2,370,136 A | 2/1945 | Berliner |
| 2,394,446 A | 2/1946 | Handler |
| 2,485,534 A | 10/1949 | Mayne et al. |
| 2,511,858 A | 6/1950 | Lampton |
| 2,522,100 A | 9/1950 | Diller |
| 2,540,709 A | 2/1951 | Burton |
| 2,652,897 A | 9/1953 | Le Compte |
| 2,658,265 A | 11/1953 | Brauchler et al. |
| 2,679,682 A | 6/1954 | Gruetjen |
| 2,751,988 A | 6/1956 | Lemont, Jr. et al. |
| 2,754,916 A | 7/1956 | Woolf |
| 2,782,862 A | 2/1957 | Wright |
| 2,807,870 A | 10/1957 | Harness |
| 2,844,001 A | 7/1958 | Alford |
| 2,882,974 A | 4/1959 | Boegehold |
| 2,928,235 A | 3/1960 | Linley et al. |
| 2,941,781 A | 6/1960 | Boyum |
| 2,981,337 A | 4/1961 | Stuart, III |
| 3,053,340 A | 9/1962 | Kutney |
| 3,092,205 A | 6/1963 | Brown et al. |
| 3,156,437 A | 11/1964 | Mercier |
| 3,393,436 A | 7/1968 | Blackhurst et al. |
| 3,403,889 A | 10/1968 | CioKajlo |
| 3,527,546 A | 9/1970 | Zeman |
| 3,647,021 A | 3/1972 | Millman et al. |
| 3,730,292 A | 5/1973 | MacDonald |
| 3,861,140 A | 1/1975 | Krabacher |
| 3,909,156 A | 9/1975 | Stahl |
| 4,023,350 A | 5/1977 | Hovan et al. |
| 4,117,671 A | 10/1978 | Neal et al. |
| 4,147,029 A | 4/1979 | Sargisson |
| 4,191,508 A | 3/1980 | Kuroda et al. |
| 4,235,568 A | 11/1980 | Zenkner |
| 4,302,934 A | 12/1981 | Wynosky et al. |
| 4,335,801 A | 6/1982 | Stachowiak et al. |
| 4,478,551 A | 10/1984 | Honeycutt, Jr. et al. |
| 4,492,078 A | 1/1985 | Williamson |
| 4,492,518 A | 1/1985 | Neal |
| 4,576,002 A | 3/1986 | Mavrocostas |
| 4,644,129 A | 2/1987 | Miller |
| 4,786,016 A | 11/1988 | Presz, Jr. et al. |
| 4,802,821 A | 2/1989 | Krietmeier |
| 4,813,230 A | 3/1989 | Braithwaite |
| 4,819,425 A | 4/1989 | Farquhar et al. |
| 4,820,117 A | 4/1989 | Larrabee et al. |
| 4,859,143 A | 8/1989 | Larrabee et al. |
| 4,909,346 A | 3/1990 | Torkelson |
| 4,920,742 A | 5/1990 | Nash et al. |
| 4,979,872 A | 12/1990 | Myers et al. |
| 4,989,406 A | 2/1991 | Vdoviak et al. |
| 4,993,918 A | 2/1991 | Myers et al. |
| 5,076,049 A | 12/1991 | Von Benken et al. |
| 5,088,279 A | 2/1992 | MacGee |
| 5,102,298 A | 4/1992 | Krietmeier |
| 5,184,459 A | 2/1993 | McAndrews |
| 5,236,303 A | 8/1993 | Fowler et al. |
| 5,265,807 A | 11/1993 | Steckbeck et al. |
| 5,292,227 A | 3/1994 | Czachor et al. |
| 5,338,155 A | 8/1994 | Krietmeier |
| 5,346,365 A | 9/1994 | Matyscak |
| 5,362,204 A | 11/1994 | Matyscak et al. |
| 5,440,875 A | 8/1995 | Torkelson et al. |
| 5,634,767 A | 6/1997 | Dawson |
| 5,761,900 A | 6/1998 | Presz, Jr. |
| 5,791,136 A | 8/1998 | Utamura et al. |
| 5,878,940 A | 3/1999 | Rosenbalm |
| 5,884,472 A | 3/1999 | Presz, Jr. et al. |
| 5,943,856 A | 8/1999 | Lillibridge et al. |
| 5,984,638 A | 11/1999 | Gresh et al. |
| 6,099,165 A | 8/2000 | Tremaine |
| 6,233,920 B1 | 5/2001 | Presz, Jr. et al. |
| 6,439,841 B1 | 8/2002 | Bosel |
| 6,739,120 B2 | 5/2004 | Moniz et al. |
| 6,786,037 B2 | 9/2004 | Balzer |
| 6,792,758 B2 | 9/2004 | Dowman |
| 6,854,260 B2 | 2/2005 | Anderson |
| 6,935,098 B2 | 8/2005 | Bardagi et al. |
| 7,017,331 B2 | 3/2006 | Anderson |
| 7,043,898 B2 | 5/2006 | Rago |
| 7,097,412 B2 | 8/2006 | DiTomasso |
| 7,100,358 B2 | 9/2006 | Gekht et al. |
| 7,251,927 B2 | 8/2007 | Anderson |
| 7,434,384 B2 | 10/2008 | Lord et al. |
| 7,698,884 B2 | 4/2010 | Maguire et al. |
| 7,753,036 B2 | 7/2010 | Lents et al. |
| 7,775,044 B2 | 8/2010 | Julien et al. |
| 7,882,696 B2 | 2/2011 | Anderson et al. |
| 8,226,522 B2 | 7/2012 | Lemmers, Jr. |
| 8,408,011 B2 | 4/2013 | Fontaine et al. |
| 8,443,515 B2 | 5/2013 | Morenko et al. |
| 8,739,513 B2 | 6/2014 | Lefebvre et al. |
| 9,352,738 B2 | 5/2016 | Kellerman |
| 10,036,276 B2 | 7/2018 | Mountz et al. |
| 2004/0068981 A1 | 4/2004 | Siefker et al. |
| 2005/0022501 A1 | 2/2005 | Eleftheriou et al. |
| 2005/0109013 A1 | 5/2005 | Eleftheriou et al. |
| 2005/0241290 A1 | 11/2005 | Lapergue et al. |
| 2008/0115484 A1 | 5/2008 | Conete et al. |
| 2009/0000304 A1 | 1/2009 | Anderson et al. |
| 2009/0114766 A1 | 5/2009 | Sjunnesson et al. |
| 2010/0005780 A1 | 1/2010 | Philippe et al. |
| 2010/0043386 A1 | 2/2010 | Perveiler et al. |
| 2010/0132370 A1 | 6/2010 | Durocher et al. |
| 2010/0135770 A1 | 6/2010 | Durocher et al. |
| 2011/0036068 A1 | 2/2011 | Lefebvre et al. |
| 2011/0126512 A1 | 6/2011 | Anderson |
| 2011/0173990 A1 | 7/2011 | Thies |
| 2012/0329593 A1 | 12/2012 | Larrabee et al. |
| 2015/0000306 A1 | 1/2015 | Perronnet et al. |
| 2015/0275749 A1 | 10/2015 | Thomassin |
| 2015/0275756 A1 | 10/2015 | Bolduc et al. |
| 2016/0279734 A1 | 9/2016 | Schick et al. |
| 2017/0126159 A1 | 5/2017 | Spierling et al. |
| 2018/0073384 A1 | 3/2018 | Bordoni et al. |
| 2018/0149091 A1 | 5/2018 | Howell et al. |
| 2019/0218969 A1 | 7/2019 | Fulleringer et al. |

FOREIGN PATENT DOCUMENTS

| | | |
|---|---|---|
| GB | 852826 | 11/1960 |
| GB | 856670 | 12/1960 |
| GB | 866555 | 4/1961 |
| GB | 1296378 | 11/1972 |
| JP | 09324699 | 12/1997 |
| WO | 2015073084 | 5/2015 |
| WO | 2017203155 | 11/2017 |

OTHER PUBLICATIONS

Head et al., "Hot-Flow Tests of a Series of 10-Percent Scale Turbofan Forced Mixing Nozzles [Jan. 1984]", NASA, Technical Paper 2268.

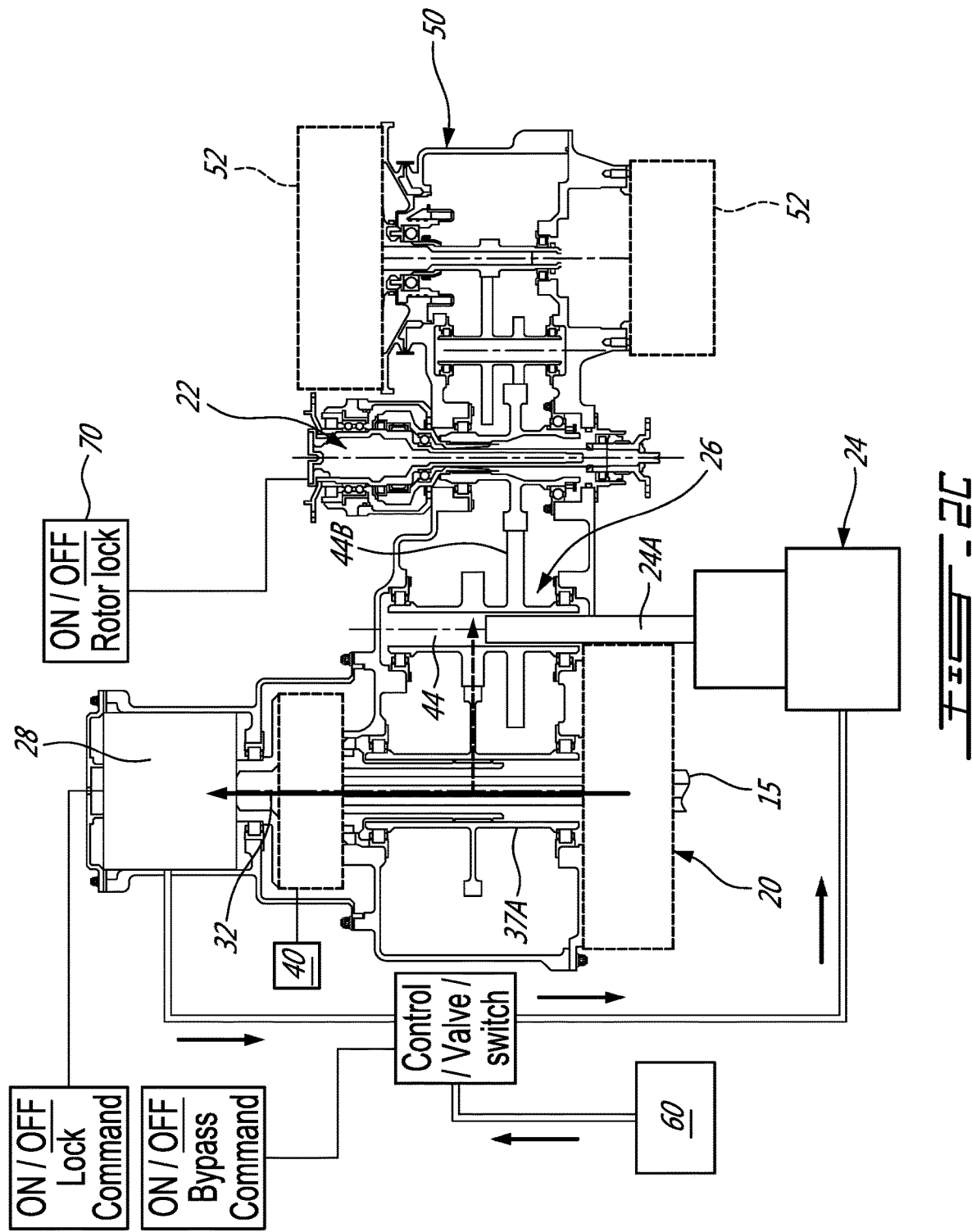

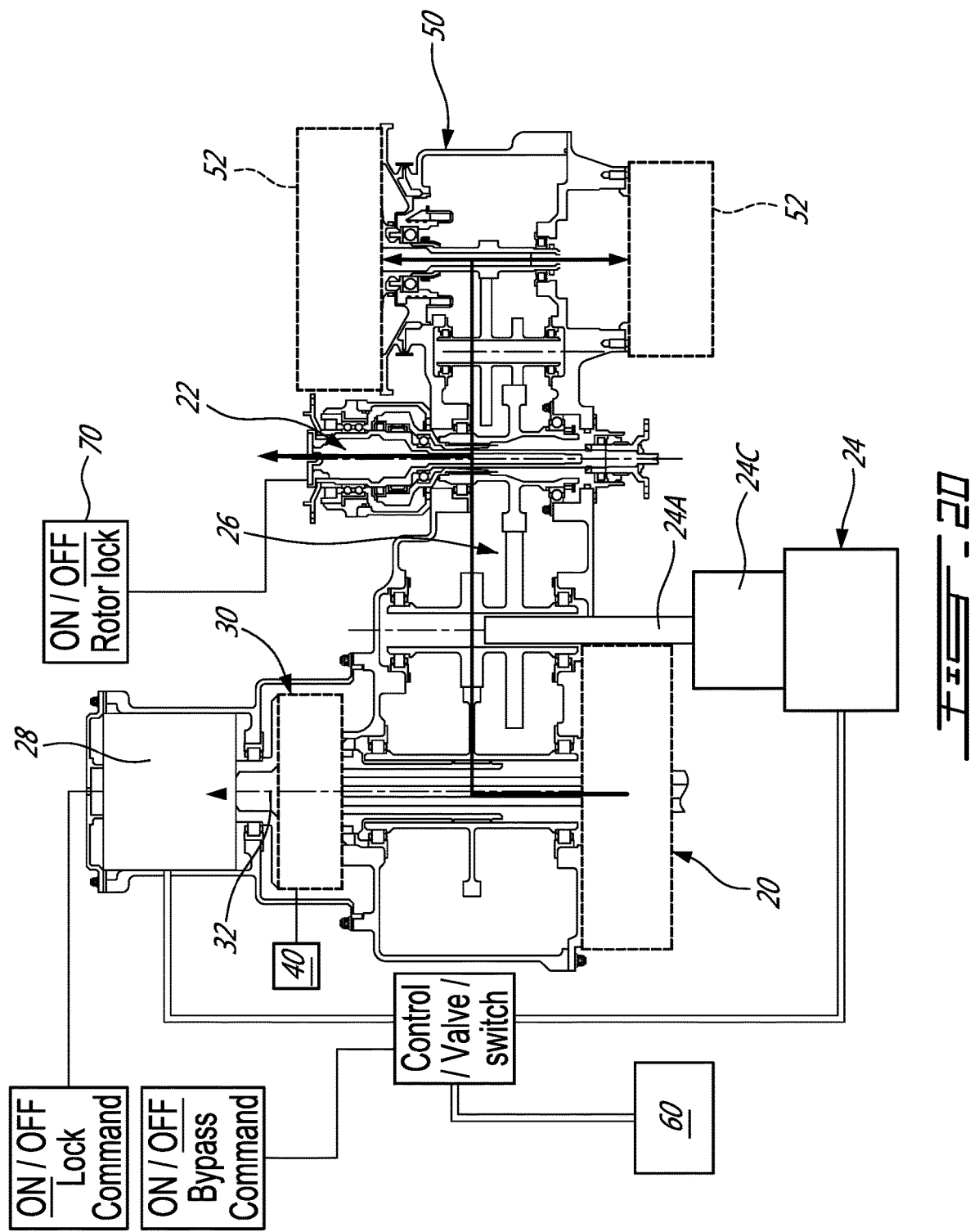

ENGINE WITH START ASSIST

CROSS-REFERENCE TO RELATED APPLICATIONS

The present application is a continuation of U.S. patent application Ser. No. 16/143,823, filed Sep. 27, 2018, the entire content of which is incorporated herein by reference.

TECHNICAL FIELD

The application relates generally to engines having multiple power sources, and, more particularly, to an engine with start assist capability.

BACKGROUND

It is desirable to be able to disconnect the primary power output of an engine from a driven load, so that the engine can be started and/or stopped without rotating the driven load and thus creating undesirable drag.

This undesirable drag is present during initial engagement between the primary power output of the engine and the driven load, when generating initial rotation of the primary power output. During this initial engagement, the inertia of the driven load can be significant and cause wear on gearing and other engine systems. This undesirable drag on the gearing systems is particularly high during certain atmospheric conditions (e.g. cold engine start-up).

SUMMARY

In one aspect, there is provided a method of starting an engine system having a first power source, a power output, and a transmission engaged with and between the first power source and the power output, the transmission including an epicyclic gear train, the method comprising: allowing free rotation of all gears of the epicyclic gear train to limit or prevent power transfer from the first power source to the power output; rotating the power output using a start assist motor; and braking one of the gears of the epicyclic gear train to transfer power from the first power source to the power output.

There is also provided an engine, comprising: a first power source configured to drive a first power input; a power output; a transmission engaged with and between the first power input and the power output, the transmission comprising: an epicyclic gear train engaged with the first power input and selectively engageable with the power output; and a brake engageable in a drive condition with the epicyclic gear train to transfer power from the first power input to the power output, the brake in a start condition disengageable from the epicyclic gear train to decouple the first power input from the power output; and a start assist motor associated with a second power source and, in use, engaged with the transmission to rotate the power output.

There is further provided an engine transmission engageable with a first power source of an engine and a power output, and also engageable with a start assist motor to provide an initial power input to the power output, the engine transmission comprising: an epicyclic gear train engaged with the first power source and selectively engageable with the power output; and a brake engageable with one of the gears of the epicyclic gear train to transfer power from the first power source to the power output, the brake disengageable from said gear to decouple the first power source from the power output; the transmission engaged with the start assist motor to provide the initial power input and initiate start-up of the power output.

BRIEF DESCRIPTION OF THE DRAWINGS

Reference is now made to the accompanying figures in which:

FIG. 2C is a view of the transmission of FIG. 2A operating in a start-assist condition; and FIG. 2D is a view of the transmission of FIG. 2A operating in a drive condition.

DETAILED DESCRIPTION

Figure 1A:
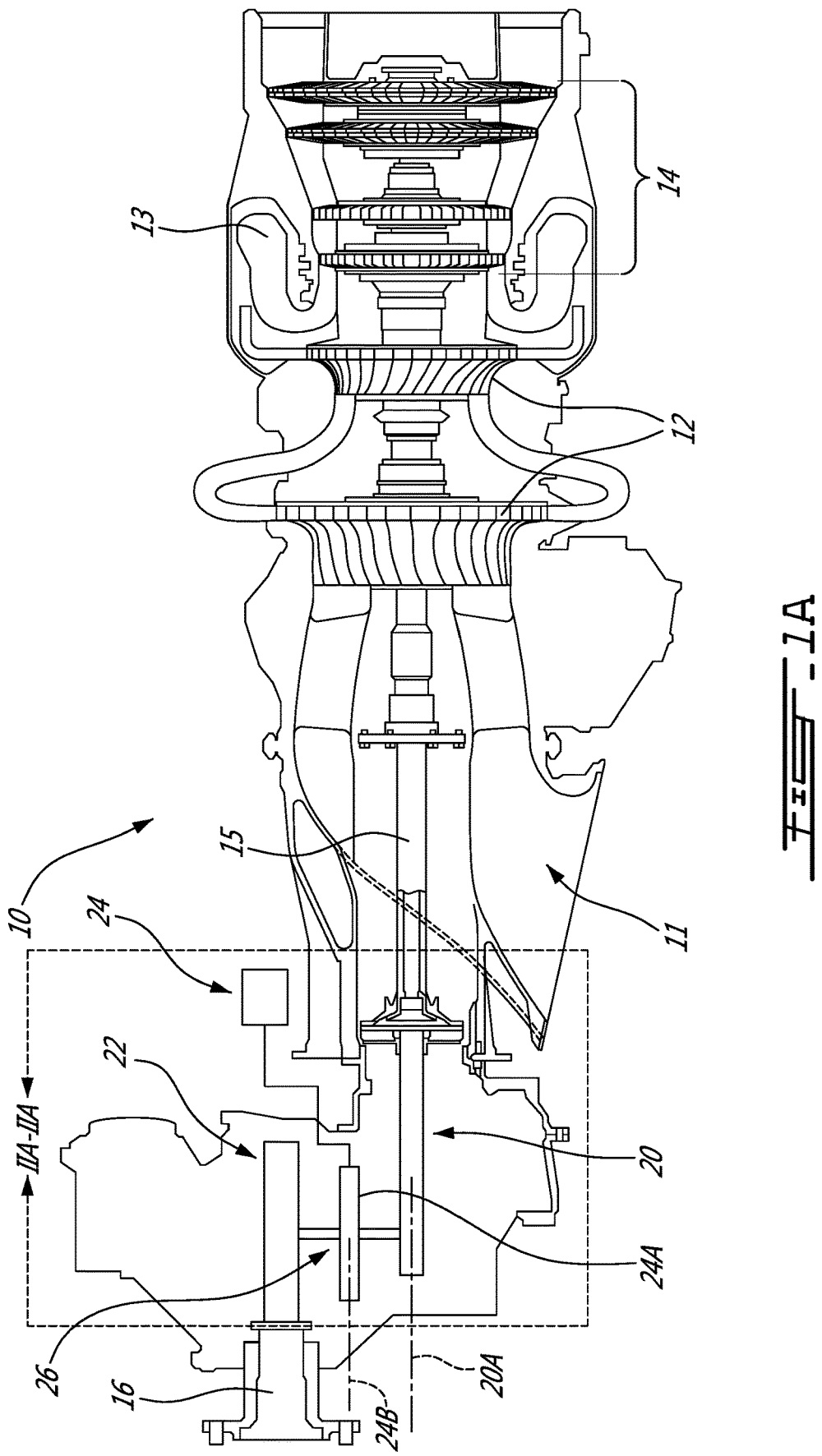
FIG. 1A is a schematic cross-sectional view of a gas turbine engine.

FIG. 1A illustrates a gas turbine engine 10 commonly referred to as a "turboprop", and of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects to transmit a rotatable driving force to a propeller shaft 16. Although the engine 10 shown in FIG. 1A is configured for driving a propeller of an aircraft, the engine 10 in an alternate embodiment is a turboshaft engine configured to drive the rotor of a helicopter. Any suitable engine may be employed.

FIG. 1A also shows schematically an arrangement of components which transmit the rotatable driving force, and thus the power and torque, provided by the power shaft 15 to the propeller shaft 16. The power shaft 15 is coupled to a first power source 20 (also referred to herein as the "first power input") in order to transmit power to the first power input 20. The first power input 20 is a first source of rotational motive power which indirectly drives the principal load of the engine 10 (e.g. the propeller, the rotor, or their respective reduction gearboxes). In the depicted embodiment, the first power input 20 is embodied as a rotatable shaft coupled to the power shaft 15 to be rotated thereby. In an alternate embodiment, the first power input 20 is embodied as a gearing arrangement which is engaged to, and driven by, the power shaft 15. In another alternate embodiment, the first power input 20 is the power shaft 15.

The first power input 20 indirectly drives a power output 22. The power output 22 is a rotatable output of the engine 10. It is a driven member that functions to drive a rotatable load. As such, the power output 22 may take any suitable form, and may include any one of the following, either alone or in combination: the propeller of an aircraft, the rotor of a helicopter, the reduction gearboxes associated with the aircraft propeller and helicopter rotor, an accessory gearbox (AGB) or accessories thereof. For example, the power output 22 in the depicted embodiment is, or is coupled to, the propeller shaft 16 to drive the aircraft propeller. In an alternate embodiment, the power output 22 is coupled to a rotor of a helicopter via the main helicopter reduction gearbox.

Still referring to FIG. 1A, the engine system 10 (or simply "engine") also has a second power source 24 capable of providing additional rotational motive power when needed. This second power source will be generally referred to herein as a start assist motor 24. The start assist motor 24 is indirectly coupled to the power output 22 to provide power to the power output 22. During certain operating conditions of the engine 10, and as will be explained in greater detail below, the start assist motor 24 provides an initial power input to the power output 22 to initiate rotation of the power output 22. The initial power input is a rotational drive which acts as a "rotor assist" in the embodiment where the engine 10 is a turboshaft engine to start rotation of the rotor and its associated gearing systems, or as a "propeller assist" in the embodiment where the engine is configured for driving a propeller of an aircraft to start rotation of the propeller and its associated gearing systems.

The start assist motor 24 is, or is associated with, a secondary source of rotational motive power which indirectly drives the principal load of the engine 10 (e.g. the propeller, the rotor, their respective reduction gearboxes, or the AGB or accessories thereof). For example, in the depicted embodiment, the start assist motor 24 is a starter motor of the hydraulic, electric, or pneumatic type. In an alternate embodiment, the start assist motor 24 is an auxiliary power unit (APU). In the depicted embodiment, the start assist motor 24 is embodied as a rotatable shaft 24A that is indirectly coupled to the power output 22, and that is driven by the secondary power source. In an alternate embodiment, the start assist motor 24 is a gearing arrangement which is engaged to the power output 22, and driven by the secondary power source.

The engine system 10 disclosed herein is a "dual-input" engine because it is provided with two sources of input motive power—the first power input 20 and the start assist motor 24. The first power input 20 and the start assist motor 24 are configured to be driven by different power sources. The first power input 20 and the start assist motor 24 in the depicted embodiment are separate. By "separate", it is understood that the first source of power for the first power input 20 is different from the second source of power of the start assist motor 24. For example, in the depicted embodiment, the first source of power of the first power input 20 is the power shaft 15, while the second source of power of the start assist motor 24 is a starter motor. This configuration of different power sources can vary. For example, in another embodiment, the first source of power of the first power input 20 is the power shaft 15, while the second source of power of the start assist motor 24 is an APU. In the depicted embodiment, the first power input 20 and the start assist motor 24 are also physically separate. The first power input 20 is rotatable about a first power input axis 20A, and the start assist motor 24 is rotatable about a second power input axis 24B. The first and second power input axes 20A,24B are spaced apart from one another. The first and second power input axes 20A,24B are not collinear.

Still referring to FIG. 1A, the first power input 20 and the start assist motor 24 operate separately in most engine operating conditions, but may also operate together for a limited period, to drive the power output 22. In the depicted embodiment, the power output 22 is the sole or single source of power for the main load of the engine 10, namely, the propeller, the rotor, their respective reduction gearboxes, or the AGB or accessories thereof. The power output 22 in the depicted embodiment is therefore the only power output to drive the propeller, the rotor, their respective reduction gearboxes, or the AGB or accessories thereof.

The engine 10 has a transmission 26 engaged with the first power input 20 and the start assist motor 24 and with the power output 22. The transmission 26 allows for the controlled application of power from the first power input 20 and the start assist motor 24 to the power output 22. As will be explained in greater detail below, the transmission 26 includes gears, gear trains, and other gear arrangements to provide speed and torque conversions from the rotating first power input 20 and start assist motor 24.

Although the engine 10 is sometimes described herein as a gas turbine engine, the engine 10 may have another configuration. The engine 10 may be an assembly of components including an internal combustion engine. The engine 10 may be a compound cycle engine system, or a compound cycle engine such as described in Lents et al. U.S. Pat. No. 7,753,036, or as described in Julien et al. U.S. Pat. No. 7,775,044, or as described in Thomassin et al. US patent publication No. 2015/0275749, or as described in Bolduc et al. US patent publication No. 2015/0275756, the entire contents of all of which are incorporated by reference herein. The engine 10 may be used as a prime mover engine, such as on an aircraft or other vehicle, or in any other suitable application.

Figure 1B:
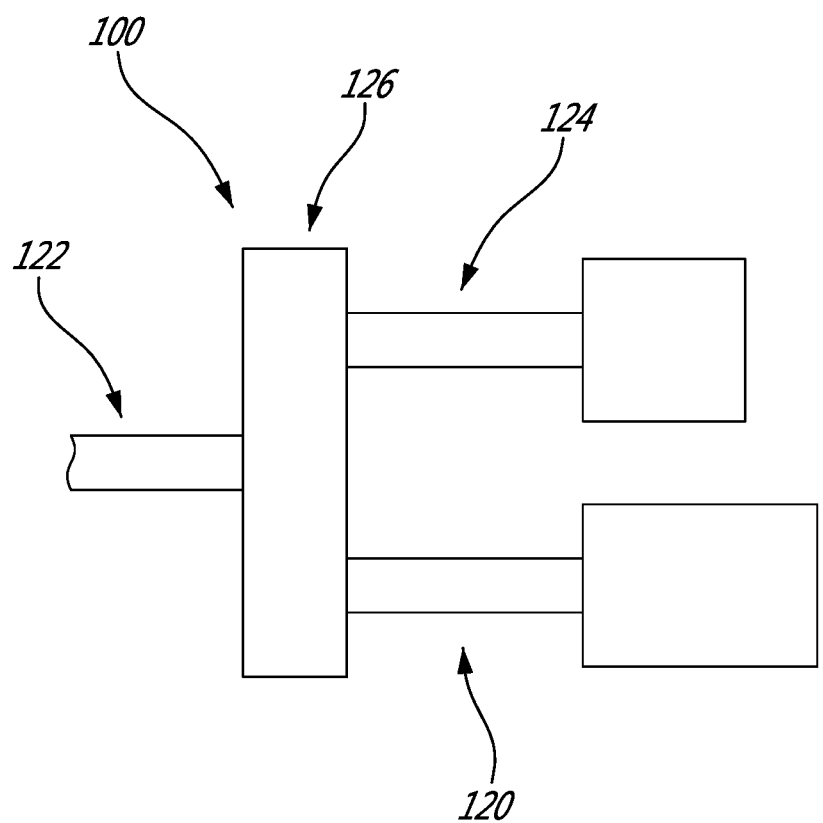
FIG. 1B is a schematic view of an engine, according to an embodiment of the present disclosure.

Indeed, FIG. 1B shows another embodiment of the engine 100. The engine 100 is a "dual-input" engine because it is provided with a first power input 120 and a start assist motor 124. The first power input 120 and the start assist motor 124 are configured to be driven by different power sources. The first power input 120 and the start assist motor 124 in the depicted embodiment are separate. The first power input 120 and the start assist motor 124 operate separately in most engine operating conditions, but may also operate together for a limited period, to drive the power output 122. The transmission 126 is engaged with the first power input 120 and the start assist motor 124 and with the power output 122. The transmission 126 allows for the controlled application of power from the first power input 120 and the start assist motor 124 to the power output 122.

Figure 2A:
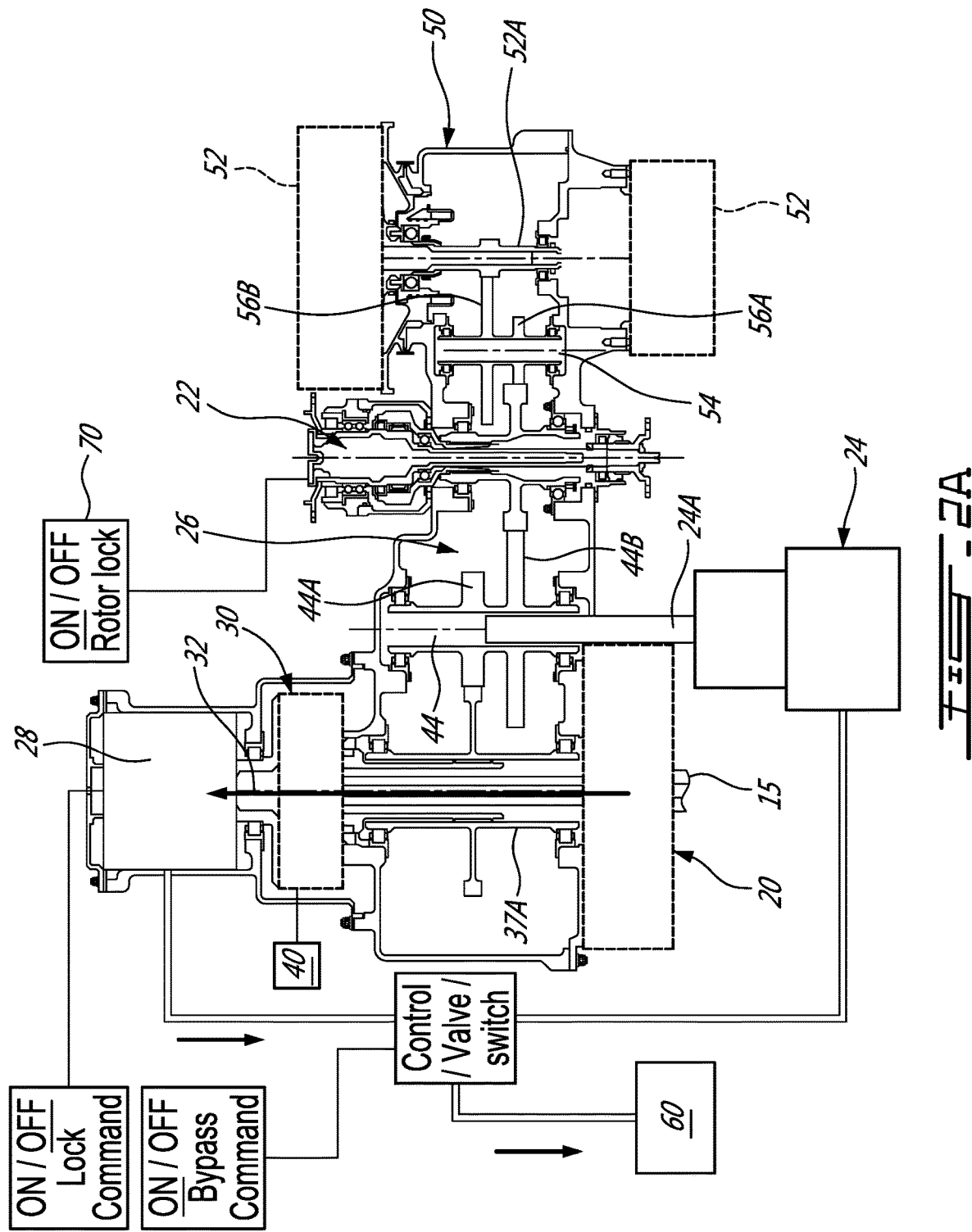
FIG. 2A is an enlarged view of the portion IIA-IIA in FIG. 1A, showing a transmission for an engine operating in a start condition.
Figure 2B:
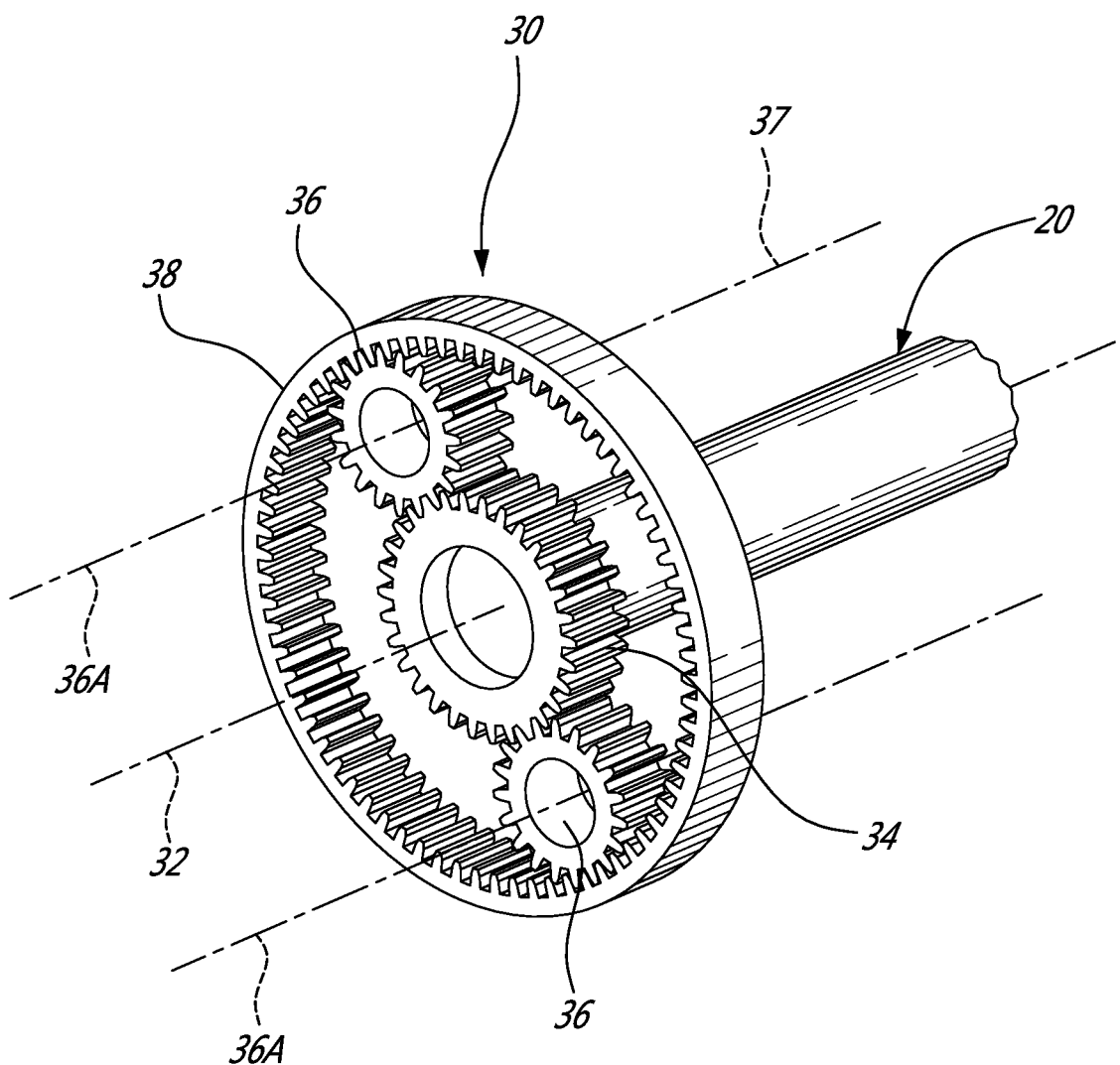
FIG. 2B is a schematic view of a planetary gear train of the transmission shown in FIG. 2A.

Referring to FIGS. 2A and 2B, the transmission 26 includes an epicyclic gear train 30. The epicyclic gear train 30 may also be referred to herein as a planetary gear train, however it is to be understood that the epicyclic gear train as described herein may also include other types of epicyclic gear trains, including "star" and "solar" gear train configurations.

The epicyclic gear train 30, which in the depicted embodiment is a planetary gear train, is engaged with the first power input 20 to be driven thereby, and is selectively engageable with the power output 22 to drive the power output 22. By "selectively engaged", it is understood that the rotation of components of the planetary gear train 30 is configurable to allow power from the first power input 20 to be transferred to the power output 22, and to prevent power from the first power input 20 being transferred to the power output 22.

Referring to FIG. 2B, the planetary gear train 30 includes a sun gear 34 rotatable about a center axis 32. The center axis 32 of the planetary gear train 30 is also collinear with the first power input axis 20A of the first power input 20. The planetary gear train 30 also has multiple planet gears 36 which mesh with the sun gear 34, and are driven thereby. The planet gears 36 mesh with, and may displace along, the inside of a ring gear 38. The planet gears 36 are therefore disposed between the sun gear 34 and the ring gear 38, and meshed with both of these. The planet gears 36 are mounted to a carrier 37 which extends between and connects the center of the planet gears 36 to displace the planet gears 36 around the sun gear 34. The carrier 37 is selectively engaged with the power output 22 to drive the power output 22. In alternate embodiments, components of the planetary gear train 30 are selectively engaged with the power output 22 to drive same. Each planet gear 36 is rotatable about its own planet gear axis 36A. Each planet gear 36 is also rotatable about the center axis 32 to thereby also cause rotation of the carrier 37 about the center axis 32. It will therefore be appreciated that the power provided by the sun gear 34 to the planet gears 36 may cause them to rotate about themselves and their planet gear axes 36A, and may also cause them to rotate about the center axis 32 such that the planet gear axes 36A move with the planet gears 36 about the center axis 32.

Still referring to FIGS. 2A and 2B, the ring gear 38 is an outermost gear of the planetary gear train 30. The radially-inner teeth of the ring gear 38 mesh with the teeth of the planet gears 36. As will be explained in greater detail below, the ring gear 38 is rotatable about the center axis 32, and may also be held stationary or in a fixed position. The ring gear 38 is mounted to a support or casing with bearings or other suitable supports.

Referring to FIGS. 2A to 2D, the transmission 26 also includes a brake 40 to engage and disengage a rotating component of the planetary gear train 30. In a drive condition of the engine 10, and in the embodiment of FIG. 2D, the brake 40 is engaged with the ring gear 38 to slow its rotation about the center axis 32. In other embodiments within the scope of the present disclosure, the brake 40 engages other components of the planetary gear train 30. The brake 40 in the drive condition may engage the ring gear 38 sufficiently to stop its rotation. The engagement of the brake 40 with the ring gear 38 and the slowing of its rotation about the center axis 32 causes power, and thus torque, to be transferred from the first power input 20 to the power output 22. Power supplied by the first power input 20 to the sun gear 34 is thus transferred to the power output 22 via the components of the planetary gear train 30.

In a start condition of the engine 10, and as shown in FIG. 2A, the brake 40 is disengaged from the ring gear 38. By "disengaged", it is understood that the relationship between the brake 40 with the ring gear 38 is such that the brake 40 does not slow or impede the rotation of the ring gear 38 about the center axis 32. The disengagement of the brake 40 from the ring gear 38 decouples the first power input 20 from the power output 22, such that no power, and thus torque, is transmitted from the first power input 20 to the power output 22. Power supplied by the first power input 20 to the sun gear 34 is thus prevented from being transferred to the power output 22 via the components of the planetary gear train 30.

It will be appreciated that the brake 40, and its engagement with the ring gear 38, can take different forms. The brake 40 may be a friction-type brake, or include electric or hydraulic elements. In an embodiment, the brake 40 has locking or meshing features which engage corresponding features of the ring gear 38. It will thus be appreciated that the engagement of the brake 40 with the ring gear 38 may take any suitable form to slow or stop a rotation of the ring gear 38.

The planetary gear train 30 and the brake 40 are therefore operable to allow for coupling and decoupling the first power input 20 to the power output 22. The transmission 26 provides a gearing arrangement for connecting and disconnecting the first power input 20 with the driven power output 22. This allows for the decoupling of the torque transfer between the first power input 20 and the power output 22, and thus between the first power input 20 and the propeller, the rotor, their respective reduction gearboxes, or the AGB or accessories thereof, while reducing friction losses.

Referring to FIGS. 2A and 2B, when the rotation of the ring gear 38 about the center axis 32 is slowed or held rotationally fixed by the brake 40, the planet gears 36 are caused to rotate within the ring gear 38 about the center axis 32. The rotation of the planet gears 36 causes the carrier 37 to also rotate about the center axis 32. The carrier 37 is engaged with the power output 22 such that rotation of the carrier 37 will rotate and drive the power output 22. Therefore, engagement of the brake 40 with the ring 38 causes rotation of the planet gears 36 by the sun gear 34, and rotation of the carrier 37, to transfer torque from the first power input 20 to the power output 22. In the embodiment where the engine 10 drives the rotor of a helicopter, to initiate main helicopter gearbox rotation, the brake 40 is activated to slow down the ring gear 38. The planet gears 36 are then free to rotate about the center axis 32 to start transmitting torque to the carrier 37, which will then start to turn the shaft of the power output 22. In an embodiment, the brake 40 is externally activated. The externally-activated brake 40 includes an activation mechanism (e.g. a switch) that is external to the transmission 26. The activation mechanism is activated by an input provided by the pilot, the engine 10, and/or the aircraft controller.

The rotating carrier 37 drives other gear components of the transmission 26 disposed between the first power input 20 and the power output 22 to transfer power from the first power input 20 to the power output 22. This arrangement of gear components can take different forms. For example, and as shown in FIGS. 2A and 2B, a carrier shaft 37A extends from the carrier 37 and is coupled thereto, or integral therewith. The carrier shaft 37A is rotated by the carrier 37, and extends parallel to the center axis 32. The carrier shaft 37A extends between the planetary gear train 30 and the power shaft 15 in the depicted embodiment. The carrier shaft 37A is co-axial with the first power input 20, and the rotatable shaft of the first power input 20 shaft is disposed within the carrier shaft 37A in the depicted embodiment.

The carrier shaft 37A engages the power output 22 to drive the power output 22. More particularly, the carrier shaft 37A engages a rotatable first geared shaft 44 of the transmission 26 that is positioned between the carrier shaft 37A and the power output 22. The first geared shaft 44 has a carrier gear member 44A engaged with the carrier shaft 37A, and a first output gear member 44B engaged with the power output 22. The first geared shaft 44 extends along an axis that is parallel to the center axis 32 in the depicted embodiment. The carrier and first output gear members 44A,44B are spaced apart along the axis of the first geared shaft 44. In the depicted embodiment, each of the carrier and first output gear members 44A,44B are bodies which protrude radially outwardly from the first geared shaft 44 and have gear teeth. The first geared shaft 44 is mounted by suitable bearings to a casing or support structure. The first geared shaft 44 provides speed and torque conversion from the rotating first power input 20 because a diameter of the first output gear member 44B is greater than a diameter of the carrier gear member 44A. In light of the preceding, it will be appreciated that in the drive condition of the engine 10, power provided by the first power input 20 to the sun gear 34 is transferred to the power output 22 via the planet gears 36, the carrier 37, the carrier shaft 37A, and the first geared shaft 44.

Referring to FIG. 2A, in the start condition of the engine 10, the brake 40 is disengaged from the ring gear 38 to allow rotation thereof, each planet gear 36 is caused to rotate about its own planet gear axis 36A by the rotating sun gear 34 because the rotation of the sun gear 34 providing torque input causes the ring gear 38 to rotate freely, via the planet gears 36. The planet gears 36 therefore spin about themselves rather than along the ring gear 38 and about the center axis 32. The carrier 37 consequently does not rotate about the center axis 32. Since the carrier 37 does not rotate, it does not output torque to the carrier shaft 37A, and thus does not output torque to the first geared shaft 44 and the power output 22. The freewheeling of the ring gear 38 and of the planet gears 36 therefore forms an effective decoupling of the first power input 20 from the power output 22. The transfer of power and torque is decoupled or made impossible when the ring gear 38 is allowed to freewheel by the brake 40.

Referring to FIG. 2C, the start assist motor 24 is used to provide the initial power input to the engine 10 to overcome the drag or inertia of the propeller, the rotor, their respective reduction gearboxes, or the AGB or accessories thereof. The start assist motor 24 is engageable with the power output 22, via the transmission 26. To ease initiation of rotation of the power output 22, the initial power input provided by the start assist motor 24 provides additional torque input from the secondary power source. This additional torque will cause, through the components described below, the shaft of the power output 22 to rotate and thus help to reduce some of the inertia effects present in the system.

The rotatable shaft 24A of the start assist motor 24 drives gear components of the transmission 26 disposed between the first power input 20 and the power output 22 to transfer power from the start assist motor 24 to the power output 22. This arrangement of gear components can take different forms. For example, and as shown in FIG. 2C, the rotatable shaft 24A of the start assist motor 24 drives the first geared shaft 44 of the transmission 26 that is positioned between the carrier shaft 37A and the power output 22. The rotatable shaft 24A rotates the first output gear member 44B engaged with the power output 22, to provide the initial power input to the power output 22 to initiate rotation thereof. The rotatable shaft 24A is co-axial with the first geared shaft 44. The rotatable shaft 24A is positioned between the carrier shaft 37A and the power output 22. The rotatable shaft 24A is positioned between the first power input 20 and the power output 22. The rotatable shaft 24A is disposed within the first geared shaft 44 and is concentric therewith. The rotatable shaft 24A extends along an axis that is parallel to the center axis 32 of the planetary gear train 30 in the depicted embodiment.

Referring to FIGS. 2A to 2D, the engine 10 also has an accessory gearbox (AGB) 50 which forms part of the load of the engine 10, and which is driven by the power output 22. The AGB 50 has accessories 52 to provide services or functions to the engine 10 or to the aircraft on which the engine 10 may be mounted. The rotating power output 22 drives gear components of the AGB 50 disposed between the power output 22 and the accessories 52 to transfer power from the power output 22 to the accessories 52. This arrangement of gear components can take different forms. For example, and as shown in FIGS. 2A to 2D, a rotatable second geared shaft 54 of the AGB 50 is disposed between the power output 22 and the accessories 52. The second geared shaft 54 is positioned between the start assist motor 24 and the accessories 52. The second geared shaft 54 has a second power input gear member 56A engaged with a gear of the output shaft 22, and a second output gear member 56B engaged with a geared shaft 52A of the accessories 52. The second geared shaft 54 extends along an axis that is parallel to the center axis 32 in the depicted embodiment. The second power input and second output gear members 56A,56B are spaced apart along the axis of the second geared shaft 54. In the depicted embodiment, each of the second power input and second output gear members 56A,56B are bodies which protrude radially outwardly from the second geared shaft 54 and have gear teeth. The second geared shaft 54 is mounted by suitable bearings to a casing or support structure. The second geared shaft 54 provides speed and torque conversion from the rotating power output 22 because a diameter of the second output gear member 56B is greater than a diameter of the second power input gear member 56A. The start assist motor 24 therefore also contributes to driving the accessories 52, along with the power output 22. The power contribution of the start assist motor 24 may help to start rotating the power output 22 and the accessories 52 before they are supplied with power from the main first power input 20.

Other configurations of the transmission 26 also allow for coupling and decoupling the first power input 20 to the power output 22, and for coupling the start assist motor 24 to the power output 22. Therefore, and although sometimes described herein as a "planetary" gear train 30, the gear train 30 may be any type of epicyclic gear train and may also operate differently and thus be referred to using other names. For example, the gear train 30 may also operate as a "star" or "solar" gear train. In different configurations of the gear train 30, a different rotating element is braked or rotationally fixed. The term "epicyclic" gear train as used herein is therefore understood to include any such configuration, including but not limited to, planetary, star, or solar type gear train systems.

Having described some structural features of the engine 10, different engine operating modes or conditions are now described in greater detail in reference to FIGS. 2A to 2D.

Referring to FIG. 2A, the engine 10 is shown in a start condition. In the start condition, the brake 40 is disengaged from one of the gears of the epicyclic gear train 30 to decouple the first power input 20 from the power output 22 such that no power is transmitted from the first power input 20 to the power output 22. In the start condition, no power is transmitted to the power output 22 or to the accessories 52. The first power input 20 is operational in the start condition, but no torque is being transferred to the power output 22 or to the accessories 52, because the gear of the epicyclic gear train 30 is allowed to rotate freely. The start assist motor 24 is inactive in the start condition. By "inactive", it is understood that the start assist motor 24 is disengaged from the transmission 26, its secondary source of power is turned off, it is rotationally locked, or is otherwise prevented from transferring power to the first geared shaft 44.

In the start condition, the first power input 20 may be used to generate power for use by the engine 10. Still referring to FIG. 2A, the engine 10 has secondary power output 28 driven by the first power input 20. In the depicted embodiment, the secondary power output 28 is the ring gear 38 of the epicyclic gear train 30. In other embodiments, the secondary power output 28 is another component not associated with the epicyclic gear train 30. The first power input 20 in the start condition drives the ring gear 38 so that it freely rotates. The freely-rotating ring gear 38 generates power, which is electrical energy in the depicted embodiment. This electrical energy may be stored in a bypass reservoir or battery 60 and/or used to power the start assist motor 24. When stored in the battery 60, the electrical energy may be used to drive the start assist motor 24. The power provided by the first power input 20 in the start condition may therefore be used to complement the secondary source of power of the start assist motor 24. As shown in FIG. 2A, in the start condition, the bypass command is set to "ON" to divert the power produced by the first power input 20 to the battery 60.

Referring to FIG. 2C, the engine 10 is shown in a start-assist condition. In the start-assist condition, the start assist motor 24 is engaged with the transmission 26 to provide the initial power input and initiate start-up of the power output 22 and accessories 52. Power is therefore supplied from the secondary power source, for a limited time, to initiate rotation of the power output 22 until the rotation of the power output 22 reaches a desired speed, or torque. In the embodiment where the engine 10 is used in an aircraft, when the pilot or operator wishes to initiate power transmission to the power output 22 (e.g. rotor or propeller), the start assist motor 24 is activated to provide the initial power input into the gear train system to thereby initiate rotation of the power output 22 and the accessories 52 through the transmission 26. The start assist motor 24 is therefore active at the very initial stages of rotor/propeller rotation, where the friction in the system is the highest and the power required to overcome the inertia of the rotor/propeller is the highest. The secondary power provided by the start assist motor 24 is therefore temporally used to help initiate the rotation of the power output 22. The start assist motor 24 helps to initiate rotation of the power output 22 when transitioning between a de-coupled or start condition (see FIG. 2A) and a coupled or drive condition (see FIG. 2D).

Still referring to FIG. 2C, the first power input 20 in the start-assist condition drives the ring gear 38 of the secondary power output 28. As shown in FIG. 2C, the bypass command is set to "OFF", such that the power from the secondary power output 28 is used to drive the start assist motor 24. Any power from the bypass reserve or battery 60 may also be used to drive the start assist motor 24. In this "rotor assist" condition with the bypass command set to "OFF", the power generated by the ring gear 38 is diverted to the start assist motor 24 to help initiate the rotation of the power output 22 and the accessories 52.

In the start-assist condition, the brake 40 may be engaged or disengaged from the ring gear 38. In an embodiment, the brake 40 in the start-assist condition disengages from the ring gear 38 for an initial period of time to decouple the first power input 20 from the power output 22. The start assist motor 24 is therefore the primary source of motive power to initiate rotation of the power output 22 and the accessories 52. This effective decoupling allows for the engine 10 to start up (i.e. through rotation of the power shaft 15) without also having to start up the power output 22 and increase drag. The engine 10 may therefore be started with the start assist motor 24 without turning the propeller, the rotor, their respective reduction gearboxes, or the AGB 50 or accessories 52. This effective decoupling may also allow the engine 10 to be used as an APU in a "hotel mode" of operation whereby it can generate power but not drive the main gearbox of the aircraft.

After a certain period of time, or when rotation of the power output 22 reaches a desired speed, the brake 40 subsequently engages the ring gear 38 to slow the rotation thereof and transfer power from the first power input 20 to the power output 22. In an alternate embodiment, the brake 40 in the start-assist condition engages the ring gear 38 to slow the rotation thereof and transfer power from the first power input 20 to the power output 22. Therefore, the brake 40 is engaged with the ring gear 38 simultaneously with the provision of the initial power input by the start assist motor 24, such that the first power input 20 and the start assist motor 24 contribute to initiating rotation of the power output 22.

Referring to FIG. 2D, the engine 10 is shown in the drive condition. In the drive condition, the brake 40 is engaged with one of the gears of the epicyclic gear train 30 to slow a rotation thereof and transfer power from the first power input 20 to the power output 22. After the start-assist condition and initial rotor/propeller start-up is completed, the first power input 20 and the power output 22 are "locked" and engaged for normal operation of the engine 10. The transition between the start-assist condition and the drive condition is achieved, for example, when the desired matching gear train speed is reached. All torque from the power generating machine, represented by the first power input 20, is thus transmitted via the transmission 26 to the power output 22 and to the accessories 52. As shown in FIG. 2D, in the drive condition, the bypass command is set to "OFF", and no power is being sent to the bypass reservoir or battery 60 by the first power input 20. The start assist motor 24 is inactive in the drive condition. The start assist motor 24 is inactive during "locked" mode because the initial power input is no longer required, because full torque is transmitted to the power output 22 from the first power input 20. The start assist motor 24 therefore includes mechanisms or devices which permit it to engage the power output 22 to provide the initial power input, and to disengage from the power output 22 when the initial power input is no longer required. For example, in the depicted embodiment, the start assist motor 24 includes a one-way clutch 24C engaged with the transmission 26. The "Sprag" or one-way clutch 24C may be used to reduce unwanted drag during normal engine operation in the drive condition. As shown in FIG. 2D, in the drive condition, the start assist motor 24 and the secondary power output 28 are rotationally locked. The start assist motor 24 and the secondary power output 28 are prevented from rotating by any suitable device or system. Since both the start assist motor 24 and the secondary power output 28 are prevented from rotating, no "drag" on the engine 10 occurs and all torque can be effectively transmitted between the first power input 20 and the power output 22. In FIG. 2D, the lock command is therefore set to "ON". In FIGS. 2A and 2C, the lock command is set to "OFF" so that the secondary power output 28 is free to rotate.

Referring to FIGS. 2A to 2D, the engine 10 has an output brake 70. The output brake 70 operates to slow a rotation of the power output 22, and to rotationally lock the power output 22. In the embodiment where the power output 22 drives a rotor or a propeller, the output brake 70 acts as a "rotor/propeller" lock. The output brake 70 in the start condition engages the power output 22 to rotationally lock the power output 22. Referring to FIG. 2A, in the start condition, some of the power provided by the first power input 20 may be distributed to the power output 22, causing some rotation of the power output 22. To reduce or eliminate this rotation of the power output 22, the output brake 70 is commanded to "ON" in FIG. 2A. In FIGS. 2C and 2D, the output brake 70 is commanded to "OFF" so that the power output 22 is free to rotate.

The engine 10 disclosed herein has multiple power inputs and/or power outputs, and helps to initiate rotation of a rotor or other power output 22 (propeller, accessories 52, etc.) before transferring full power from the main engine to the power output 22.

Referring to FIGS. 2A to 2D, there is also disclosed a method of operating the engine 10. The method includes disengaging the brake 40 from one of the gears 38 of the epicyclic gear train 38 to decouple the first power input 20 from the power output 22 such that no power is transmitted from the first power input 20 to the power output 22. The method also includes engaging the gear 38 of the epicyclic gear train 30 with the brake 40 to slow a rotation thereof and transfer power from the first power input 20 to the power output 22. The method includes providing the initial power input to the power output 22 with the start assist motor 24 to initiate start-up of the power output 22. The steps of the method disclosed herein are not necessarily performed in the sequence in which they are described. The steps of the method disclosed herein may be performed in a sequence different from the sequence in which they are described, or the steps may be combined to be performed together with another step.

Referring to FIGS. 2A to 2D, there is also disclosed a method of starting an engine. The method includes allowing rotation of all gears 34,36,38 of the epicyclic gear train 30 such that no power is transmitted from the first power source to the power output 22. The method also includes rotating the power output 22 using the start assist motor 24. The method also includes braking one of the gears 34,36,38 of the epicyclic gear train 30 to transfer power from the first power source to the power output 22. It will be appreciated that the steps of the method may be performed in any desired sequence, and are not limited to being performed according to the sequence in which they are presented.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of operating an engine at a start condition in which the engine is starting up and at a drive condition in which the engine is in full operation, the engine having a first power input and a second power input, the method comprising:
   in the start condition in which the engine is starting up,
      allowing free rotation of gears of an epicyclic gear train of a transmission to limit or prevent power transfer from the first pow r input to a main load of the engine; and
      driving part of the transmission separate from the epicyclic gear train with the second power input to transfer power from the second power input to the main load and initiate rotation of the main load; and
   In the drive condition in which the engine is in full operation,
      braking one of the gears of the epicyclic gear train to transfer power from the first power input to the main load; and
      preventing the second power input from transferring power to the main by rotationally locking the second power input.

2. The method of claim 1, wherein allowing free rotation of gears of the epicyclic gear train includes driving the second power input with the notating gears of the epicyclic gear train.

3. The method of claim 1, wherein allowing free notation of gears of the epicyclic gear train includes rotating the gears about a first axis, and wherein driving part of the transmission separate from the epicyclic gear train with the second power input includes rotating the second power input about a second axis that is spaced apart from the first axis.

4. The method of claim 1, wherein driving part of the transmission separate from the epicyclic gear train with the second paw input includes driving part of the transmission with the second power input for an initial period after braking one of the gears of the epicyclic gear train.

5. The method of claim 1, wherein preventing the second power input from transferring power to the main load includes preventing the second power input from transferring power to the main load while simultaneously braking one of the gears of the epicyclic gear train.

6. The method of claim 1, wherein allowing free rotation of gears of the epicyclic gear train includes generating electrical energy with the notating gears and storing the electrical energy in a battery.

7. The method of claim 6, wherein driving part of the transmission separate from the epicyclic gear train with the second paw input includes driving part of the transmission with the second power input using the electrical energy from the battery.

8. The method of claim 1, wherein preventing the second power input from transferring power to the main load includes inactivating the second power input.

9. A method of operating an engine at a start condition in which the engine is starting up and at a drive condition in which the engine is in full operation, the engine having a first power input and a second power input, the method comprising:
   in the start condition in which the engine is starting up,
      allowing free rotation of wars of an epicyclic gear train of a transmission to limit or prevent power transfer from the first power input to a main load of the engine; and
      driving cart of the transmission separate from the epicyclic gear train with the second power input to transfer power from the second power input to the main bad and initiate rotation of the main load, to transfer power from the second paw input to accessories of an accessory gearbox and initiate rotation of the accessories; and
   in the drive condition in which the engine is in full operation,
      braking one of the gears of the epicyclic gear train to transfer power from the first power input to the main load; and
      preventing the second power input from transferring power to the main load.

10. The method of claim 9, wherein driving part of the transmission separate from the epicyclic gear train with the second power input includes driving part of the transmission with the second power input for an initial period after braking one of the gears of the epicyclic gear train.

11. A method of operating an engine at a start condition in which the engine is starting up and at a drive condition in which the engine is in full operation, the engine having a first power input and a second power input, the method comprising:
   in the start condition in which the engine is starting up,
      rotationally locking the main load and allowing free rotation of gears of an epicyclic gear train of a transmission to limit or prevent power transfer from the first power input to a main load of the engine, and
      driving part of the transmission separate from the epicyclic gear train with the second power input to transfer power from the second power input to the main load and initiate rotation of the main load; and in the drive condition in which the engine is in full operation,
braking one of the gears of the epicyclic gear train to transfer power from the first power input to the main load; and
preventing the second power input from transferring power to the main load.

12. An engine, comprising:
a first power input and a second power input;
a main load;
a transmission engaged with and between the first power input, the second power input and the main load, the transmission comprising:
an epicyclic gear train engaged with the first power input and selectively engageable with the main load; and
a brake engagable in a drive condition with the epicyclic gear train to transfer power from the first power input to the main load, the brake in a start condition disengageable from the epicyclic gear train to decouple the first power input from the main load;
a start assist motor associated with the second power input and engaged with part of the transmission separate from the epicyclic gear train, the start assist motor in the start condition rotating the main load to initiate start up of the engine, the start assist motor and a secondary load being rotationally locked in the drive condition, the start assist motor in the drive condition thereby being prevented from transferring power to the main load.

13. The engine of claim 12, comprising the secondary load to be driven by the first power load.

14. The engine of claim 13, wherein the secondary load is one of the gears of the epicyclic gear train, the first pow input in the start condition driving said gear, the gear thereby freely rotating.

15. The engine of claim 14, wherein said gear freely notating generates electrical energy, the engine comprising a battery to store the electrical energy, and to provide the electrical energy to drive the start assist motor.

16. The engine of claim 13, wherein the secondary load is one of the gears of the epicyclic gear train, the first power input driving said gear of the epicyclic gear train, said gear of the epicyclic gear train driving the start assist motor.

17. The engine of claim 13, wherein the brake disengages from one of the gears of the epicyclic gear train to decouple the first pow input from the main load, and subsequently engages said gear to transfer power from the first pow input to the main load.

18. The engine of claim 13, wherein the second power source is different from the first power input.

19. An engine, comprising:
it first power input and a second power input,
main load;
transmission engaged with and between the first power input, the second power input, and the main load, the transmission comprising:
an epicyclic gear train engaged with the first power input and selectively engageable with the main load, and
a brake engageable in a drive condition with the epicyclic gear train to transfer power from the first power input to the main load, the brake in a start condition disengageable from the epicyclic gear train to decouple the first power input from the main load; and
a start assist motor associated with a second power input and engaged with part of the transmission separate from the epicyclic gear train, the start assist motor in the start condition rotating the main load to initiate start up of the engine, the start assist motor in the drive condition prevented from transferring power to the main load; and
an accessory gearbox engaged with the transmission and having accessories, the start assist motor in the start condition transferring power to the accessory gearbox to initiate rotation of the accessories.

20. The engine of claim 19, wherein in the drive condition, the start assist motor and the secondary load are rotationally locked.

* * * * *